F. A. JOHNSON.
DIVIDER, HUSKER, AND DISTRIBUTER FOR CORN.
APPLICATION FILED APR. 23, 1915.

1,183,069.

Patented May 16, 1916.
2 SHEETS—SHEET 1.

Witnesses
Stuart Hilder.
Frances M. Anderson

Inventor
Frank A. Johnson
By E. W. Anderson & Son
his Attorneys

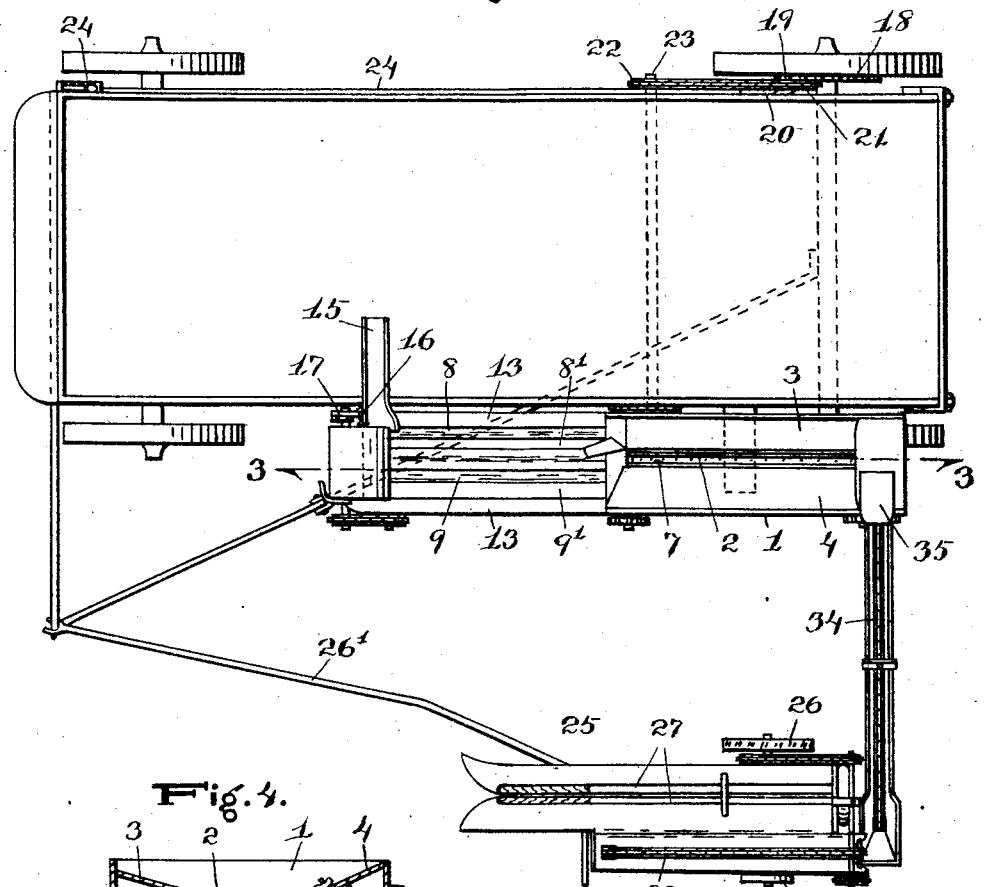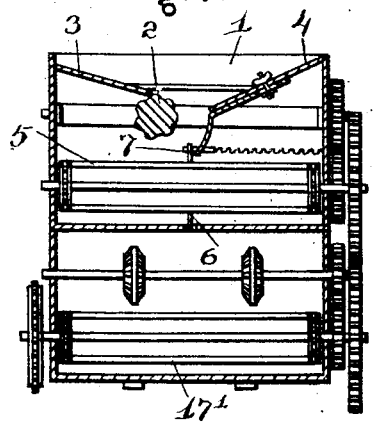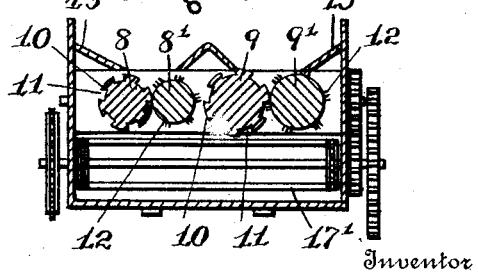

UNITED STATES PATENT OFFICE.

FRANK A. JOHNSON, OF REMSEN, IOWA.

DIVIDER, HUSKER, AND DISTRIBUTER FOR CORN.

1,183,069.   Specification of Letters Patent.   Patented May 16, 1916.

Application filed April 23, 1915. Serial No. 23,451.

*To all whom it may concern:*

Be it known that I, FRANK A. JOHNSON, a citizen of the United States, resident of Remsen, in the county of Plymouth and State of Iowa, have made a certain new and useful Invention in Dividers, Huskers, and Distributers for Corn; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
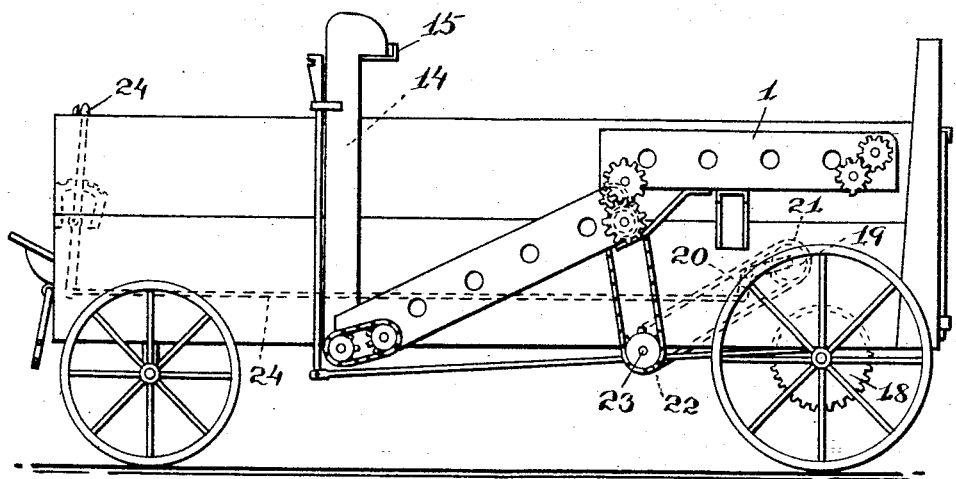
Figure 3:
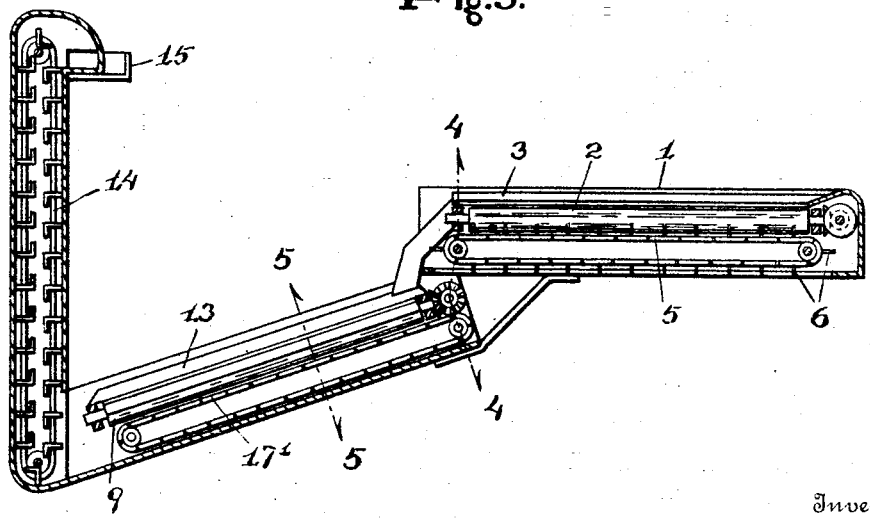

Figure 1 is a side view of the invention with parts removed as applied to a wagon. Fig. 2 is a plan view of the invention as applied, showing the snapper. Fig. 3 is a section on the line 3—3 Fig. 2. Fig. 4 is a section on the line 4—4 Fig. 3. Fig. 5 is a section on the line 5—5, Fig. 3.

The invention has relation to apparatus designed for attachment to an ordinary farm wagon, for grading the ears of corn, husking the ears and delivering the husked ears in an evenly distributed manner to the wagon, the unhusked ears being delivered to the divider from the snapper, also operating in connection with the wagon.

Other objects and advantages will hereinafter appear.

The invention consists in the novel construction and combination of parts, as hereinafter set forth.

In the accompanying drawings, illustrating the invention, the numeral 1 designates the grader, having suitable support at the side of the wagon, and to which the ears of corn are delivered from the snapper.

The grader comprises a box or casing 1, wherein is mounted a longitudinal roller 2, protected upon one side by an inclined guard 3, an inclined shelf 4 being provided at the opposite side of said roller, said shelf having at its inner end a curved grading board strip approximately parallel to that of the roller, so that the ears of corn delivered at one end of the grader box, upon the shelf 4, will fall through between the roller and the grader board to the apron below. The smaller ears will pass under the roller 2, the height of the roller from the endless conveyer or apron 5, forming the bottom of the box, being designed to allow this; but the larger ears will not be able to pass under this roller. These larger ears will remain in the space between the dividing board and the roller and be carried along in this space by the conveyer, said pins 6, of the apron, working in this space, and any small ears of corn remaining among the larger ears in this space will, by contact with the spring 7, located in the space, be pressed toward and under the roller, whereby an efficient division is designed to be accomplished of the large and small ears. An adjusting means is provided for the grader board, to vary the interval of separation from the roller 2, for different sizes of ears, a thumb-screw being preferred for this purpose. The endless conveyer delivers, at its rear end, the divided large and small ears to the inclined husking rollers 8, 8' and 9, 9', each pair of rollers working together and being alike except with respect to size, to operate upon the larger and smaller ears.

The rollers 8 and 9, of each pair, are each provided with longitudinal teeth 10, of wedge or dovetail form in cross-section, said teeth being separated by intervals 11 wherein engage, in an intermeshing manner, the longitudinal series of pins 12 of the rollers 8' and 9'. The ears of corn being delivered upon the tops of the pairs of rollers, which are partially covered by inclined guides 13 in a trough-like manner, the husks will be gripped by the pins and teeth of the rollers and torn from the ears, which will roll down the inclined troughs and be delivered at the bottom thereof to the upright endless belt conveyer 14, said conveyer discharging at its upper end into the trough or chute 15, extending laterally over the wagon body, whereto it will deliver the husked ears. Suitable means are provided to operate the conveyer belt at the bottom of the divider box, the pairs of husking rollers, the belt 17', the divider rollers and the upright conveyer, said means having preferably a main driving connection with one of the axles of the wagon.

The laterally extending chute or spout 15, which delivers the ears of corn to the wagon, is pivoted at one end at 16, and suitable means 17 are provided to vibrate or throw this chute from one side to the other, or forward and back, to deliver the corn to all parts of the wagon body in an even or distributed manner. The casing for the upright conveyer and for the husking rollers also has a suitable means of support from the wagon. The husks are delivered between the husking rollers to an endless apron or belt 17′, below said rollers, said apron discharging the husks upon the ground or into a suitable receiver. Usually the rear axle of the wagon will be provided with a gear wheel 18, with which a gear wheel 19, carried at the end of a pivotal arm 20, will have engagement, a sprocket wheel 21 being located upon the shaft of the gear 20 and having chain connection with sprocket wheel 22 upon a transverse shaft 23, the various driving connections for the conveyers and belts being made from this transverse shaft 23. Upon raising the pivotal arm 20, by suitable means, such as the lever connection 24, the gear 19 will be raised from engagement with the gear 18 of the axle, when the invention will be thrown out of operation. The invention is as readily thrown into use again by operation of the lever to restore the gear engagement.

Usually six of the beveled or dovetail cutter teeth or blades will be provided around the periphery of each roller 8 or 9. The other rollers, 8′ and 9′, are each smooth, and the pins thereof are preferably about one-sixteenth of an inch in length, the smooth peripheral portions of the rollers working against the outer edges of the cutter blades and the pins working in the intervals between the blades, to start the tight husks from the ears. The beveled edges of the blades cut the husks from the ears. By providing two pairs of rollers of different sizes, for the large and small ears of corn, the corn will be kept from shelling and becoming mashed. Only one edge of each cutter blade is in use for husking, and when this edge becomes dull the blade may be secured in reversed position upon the roller, to bring the other edge into use, when the dull edge will be automatically sharpened by frictional contact with the smooth peripheral surface of the other roller.

The snapper 25 is mounted upon wheels 26, and has a draft connection 26′ with the wagon, to move therewith along the cornfield. This snapper is provided with corrugated snapping rollers 27, the corn stalks being gripped thereby and caused to pass down between the same, the ears of corn being too large to pass between the rollers, and remaining on top, and being snapped or separated from the stalks and rolling down the inclined sides of the snapper top frame to a longitudinal inclined conveyer 33. This conveyer carries the ears of corn to the top of the snapper frame and delivers said ears to a laterally extending inclined conveyer 34, discharging at its upper end into the grader, a guard 35 being provided at the upper end of the last named conveyer, to deflect the ears of corn downward into the grader.

What I claim is:

1. Apparatus for the purpose described, comprising a conveyer for the ears of corn, means into which said conveyer discharges for automatically grading the ears of corn, separate means for husking the large and small ears and means for feeding the graded ears of corn separately to the separate husking means.

2. Apparatus for the purpose described, comprising a conveyer for the ears of corn, means into which said conveyer discharges for grading the ears of corn, including a casing, a longitudinal roller therein, a moving bottom for said casing, means for causing the small ears of corn to pass under said roller, separate means for husking the large and small ears of corn and means for feeding the graded ears of corn separately to the separate husking means.

3. Apparatus for the purpose described, comprising a conveyer for the ears of corn, means into which said conveyer discharges for grading the ears of corn, including a casing, a longitudinal roller therein, an endless apron forming the bottom of said casing, means for causing the small ears of corn to pass under said roller, including a grader strip approximately parallel to and spaced from said roller, and a spring device, and separate means for husking the large and small ears of corn, said apron having pins located in the space between said strip and said roller.

4. In apparatus for the purpose described, husking rollers, one of which is provided with longitudinal cutting blades or teeth of dove-tail form in cross-section and longitudinal channels between said teeth, and the other of which is provided with longitudinal series of grouped radial pins fitting in said channels.

In testimony whereof I affix my signature, in presence of two witnesses.

FRANK A. JOHNSON.

Witnesses:
L. S. HOMAN,
R. E. COURSON.